April 12, 1966  R. W. ALLINGTON  3,245,461
CONTROL APPARATUS
Filed Aug. 15, 1962  3 Sheets-Sheet 2

| PERMU-TATION | CONTROL CHANNEL INFORMATION | | EFFECTING MECHANISM TO BE USED TO CORRECT THE CONDITION OF THE AIR | | | | |
|---|---|---|---|---|---|---|---|
| | (1) TEMPERATURE ERROR | (2) HUMIDITY ERROR | AIR COOL | AIR HEAT | WATER COOL | WATER HEAT | |
| | | | | | | LOW RATE | HIGH RATE |
| A | OK | OK | | | | | |
| B | OK | TOO DRY | | | | X | |
| C | OK | TOO HUMID | | | X | | |
| D | TOO LOW | OK | | X | | X | |
| E | TOO LOW | TOO DRY | | | | | X |
| F | TOO LOW | TOO HUMID | | X | X | | |
| G | TOO HIGH | OK | X | | | | |
| H | TOO HIGH | TOO DRY | X | | | | |
| I | TOO HIGH | TOO HUMID | X | | X | | |

F̲I̲G̲-̲2̲

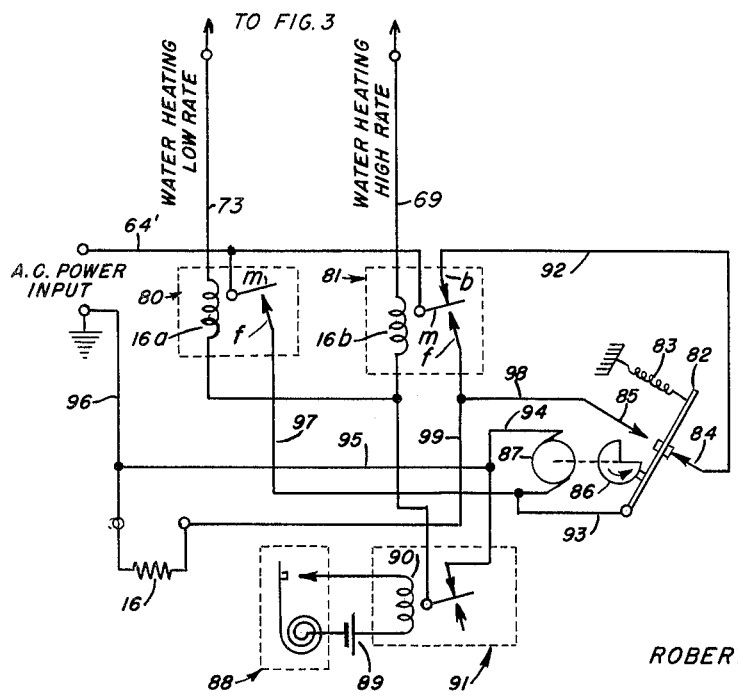

F̲I̲G̲-̲4̲

ROBERT W. ALLINGTON
INVENTOR.

BY RICHARDS & CIFELLI
ATTORNEYS

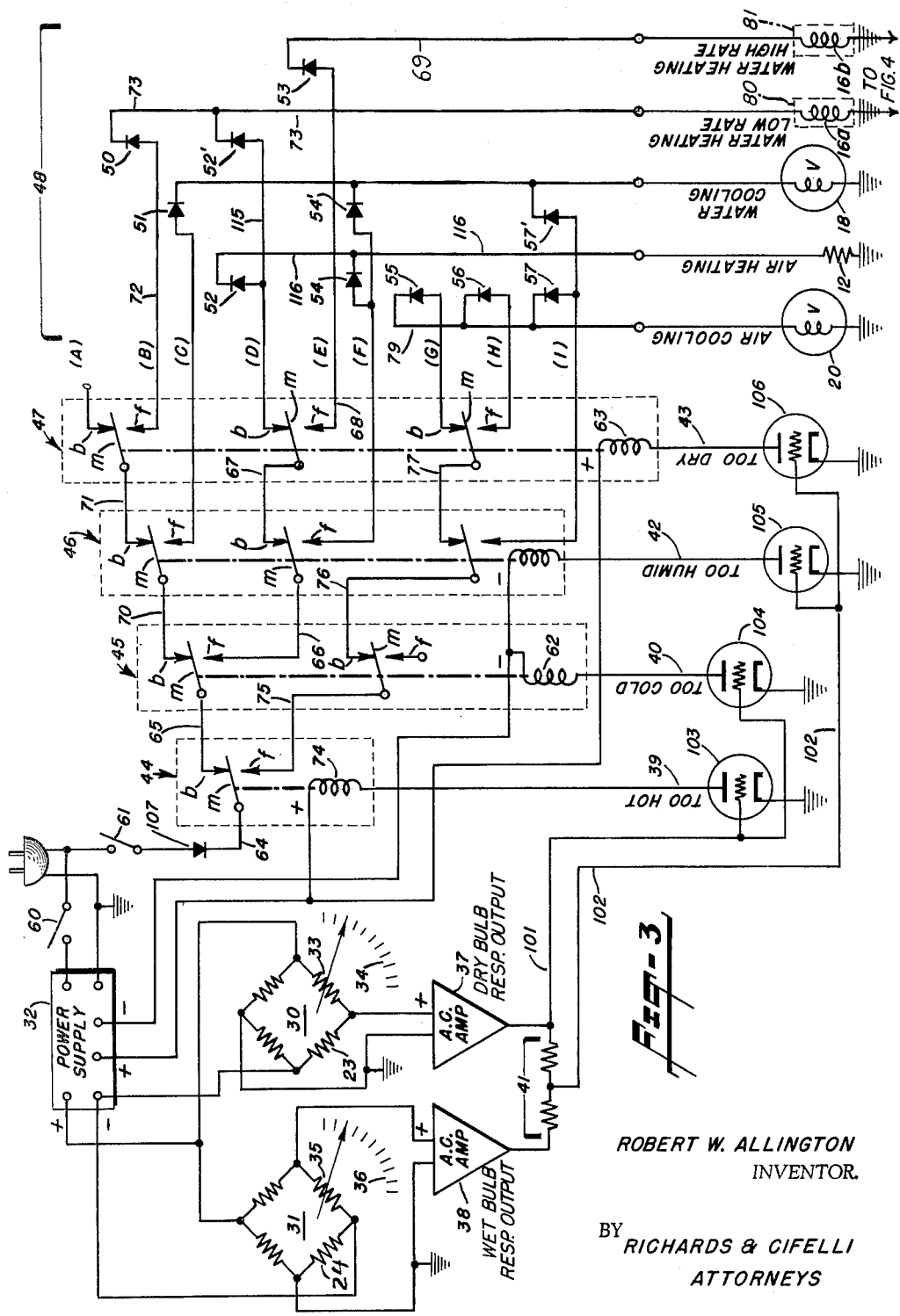

United States Patent Office 3,245,461
Patented Apr. 12, 1966

3,245,461
CONTROL APPARATUS
Robert W. Allington, Lincoln, Nebr., assignor to Instrumentation Specialties Company, Lincoln, Nebr., a corporation of Nebraska
Filed Aug. 15, 1962, Ser. No. 217,205
18 Claims. (Cl. 165—21)

This invention relates to control apparatus and more particularly to apparatus for controlling the parameters of several variable factors thereby to produce a preselected end result.

The apparatus disclosed herein is of general application for controlling each of several, interrelated factors which contribute to the establishment of a predetermined set of conditions such as, for example (pressure-temperature-humidity) (pH and oxidation-reduction potential), etc. However, the following description of the apparatus will be made specific to the control of temperature, humidity and other factors involved in a plant growth environmental chamber.

Existing temperature-humidity control systems utilize a temperature-sensing element to control the temperature of air by suitable heating and cooling means and a humidity-sensing element to control the moisture content of the air by suitable moistening or drying means. Such prior systems, however, generally do not take into consideration the interaction effects of temperature and humidity. If the mass of water vapor per unit mass of air is kept constant, heating the air will lower the relative humidity and cooling the air will raise the relative humidity. Also, when an effecting mechanism of an air conditioning system is operated, it may cause both a change in temperature and a change in the ratio of water vapor mass to air mass of the conditioned air. For example, a cold surface both cools air and condenses water vapor out of it. Similarly, a water spray will both humidify air and cool air because of the heat of vaporization of the water which is vaporized. The latter condition can be overcome to some extent by controlling the temperature of the water in the spray.

The conditions, mentioned hereinabove, make it difficult to obtain stable, unfluctuating operation of a conventional temperature-humidity control system which is capable of providing a wide range of closely-controlled temperatures and humidities. One conventional approach to the problem is to provide a system wherein the dew point is set, with humidity apparatus, at a temperature below the desired operating temperature, and then heating the air to the operating temperature before it is delivered to the enclosure. Such system, however, has a narrow operating range and requires elaborate air-handling apparatus.

A system wherein the moisture content of air is varied by passing the air over a water bath having a controlled temperature has the advantage that substantially the same water surface is presented to the air regardless of whether the water is being heated or cooled. It also has the advantage that there are no water sprays, or the like, to clog up or to mix droplets of unvaporized water with the conditioned air. Such a system, using a water bath, is not stable, for when the water is heated to raise the humidity, it also heats the air passing over it. This will cause the control system to call for a cooling of the air which, in turn, will have an effect upon the humidity. Such interactions can cause fluctuations to appear in the control of the temperature and humidity.

In a control system made in accordance with this invention, consideration purposely is given to the interrelated effects of temperature and humidity in such a way as to compensate for interactions of the heating-cooling and moistening-drying mechanisms. This is accomplished by utilizing a pair of temperature and humidity sensing elements which operate a pair of elementary controls, each control being provided with two, or preferably three, or more possible outputs. For example, the three outputs of the elementary temperature control can correspond to temperature levels which are "too hot," "temperature correct," and "too cold." Similarly, the outputs of the elementary humidity control can correspond to humidity levels which are "too wet," "humidity correct" and "too dry." A circuit is provided wherein various combinations of the outputs of the control elements effect an appropriate change in the condition of the air thereby to maintain the air at a preselected temperature and humidity. The required changes in temperature are made without causing fluctuations in humidity and vice versa.

An object of this invention is the provision of an improved temperature-humidity control system.

An object of this invention is the provision of a stable system for the control of temperature and humidity, which system compensates for the interactions of the mechanisms utilized to effect a change in the temperature and/or humidity of a confined air mass.

An object of this invention is the provision of control apparatus having sensing elements responsive to changes in selected variable factors which normally interact to effect the state of a set of conditions under control, and means actuated by the sensing elements for effecting a change in one or more of such factors thereby to maintain the set of conditions in a preselected state.

An object of this invention is the provision of a control system for maintaining a variable set of conditions in a predetermined state, which system comprises sensing means individually responsive to changes in selected factors which effect the state of the set of conditions, control means operable in a predetermined manner in correspondence with changes in the sensing means, and means actuated by said control means to effect a change only in such factors which caused a change in the set of conditions from the predetermined state.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 2 is a table showing the type of control functions to be effectuated for various temperature-humidity conditions;

FIGURE 3 is a schematic circuit diagram of the control system; and

FIGURE 4 is a schematic circuit diagram of an arrangement for heating the water bath at two different rates.

Figure 1:
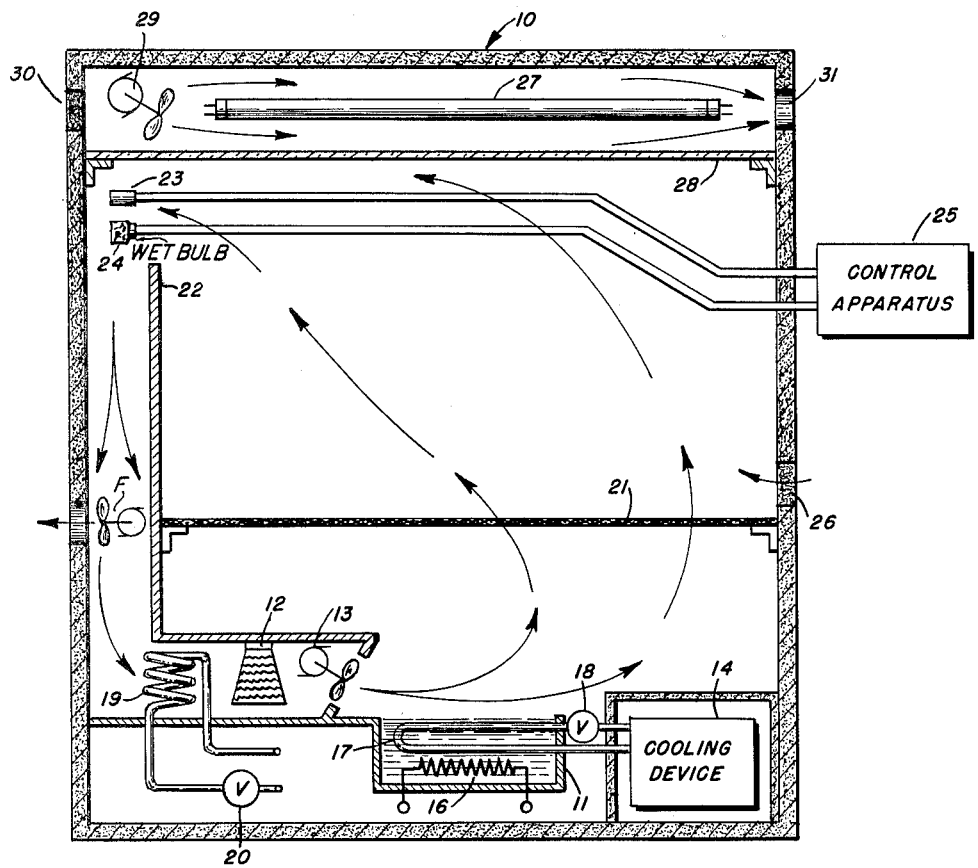
FIGURE 1 is a diagrammatic representation of an environmental chamber.

Reference, now, is made to FIGURE 1, wherein there is shown an environmental chamber 10, of suitable construction, and having insulated walls. Disposed at the bottom of the chamber is a pan 11 containing water, an electrical air heating element 12, a fan 13 and a refrigerating apparatus, or cooling device 14. The fan is arranged to circulate air through the environmental chamber and direct it over the surface of the water. Immersed in the water is an electrical heating element 16 and a cooling coil 17, the latter being connected to the cooling device and the flow of coolant therethrough controlled by a solenoid operated valve 18. A second cooling coil 19 is disposed in the flow of air circulated by the fan 13, and the flow of coolant therethrough is controlled by a solenoid operated valve 20.

A suitable shelf 21 is adjustably positionable between a wall of the chamber and a vertical partition wall 22. A dry bulb sensing element 23 and a wet bulb sensing element 24 are positioned to be effected by the temperature and humidity of the contained air, the flow of which is indicated, generally, by the arrows. Each sensing element is connected to the control apparatus 25 by individual leads. An air intake filter 26 and an exhaust fan F are provided to effect a change in the contained air, when desired.

The components described to this point cooperate to maintain the temperature and humidity of the contained air at predetermined levels, as will be described in detail hereinbelow. When the chamber is to be used as a plant growth environmental chamber, one or more fluorescent lamps 27 are provided, said lamps being positioned within a separate chamber defined by the glass window 28. A fan 29 is provided to circulate air through the filter 30 and out of the exhaust port 31.

The sensing elements 23 and 24 are thermistors, which change in electrical resistance with temperature (in accordance with a negative temperature coefficient of resistance) and are connected to bridge circuits which are balanced when the temperature and humidity of the contained air each are at preselected levels. Deviations of the temperature or humidity from the preselected levels unbalance the bridge circuits which results in discrete bridge output voltages which are utilized to effect operation of the heating elements or cooling coils thereby to provide a proper corrective action. Such discrete output voltages correspond to three states of the temperature control function and three states of the humidity control function. In the case of the temperature control function, the three output voltages correspond to conditions wherein the temperature of the contained air is either "too high," "at preset level", or "too low." In the case of the humidity control function, the three output voltages correspond to conditions wherein the contained air is "too humid," "at preset level," or "too dry." These three possible states of temperature and humidity provide a total of nine (9) possible permutations of temperature and humidity errors, as follows:

(A) Temperature and humidity correct,
(B) Temperature correct, humidity too low,
(C) Temperature correct, humidity too high,
(D) Temperature too low, humidity correct,
(E) Temperature too low, humidity too low,
(F) Temperature too low, humidity too high,
(G) Temperature too high, humidity correct,
(H) Temperature too high, humidity too low,
(I) Temperature too high, humidity too high.

The control system, made in accordance with this invention, reacts to effect a change in the condition of the air, in the air-conditioned enclosure, in correspondence with the above permutations. By taking into consideration whether the humidity is at the proper level, during the required change in temperature, it is possible to control the air temperature without causing humidity fluctuations. Conversely, by taking into consideration whether the temperature is at the proper level, during a required change in the humidity, it is possible to control air humidity without causing temperature fluctuations. Thus, by properly controlling two or more parameters, simultaneously, the control system exhibits a high order of stability.

For present purposes of description, it is pointed out that the control system includes two channels, one responsive to temperature changes and the other responsive to humidity changes. Temperature changes are sensed directly by the dry bulb thermistor 23. On the other hand, humidity changes are derived from the difference between the instantaneous values of the dry bulb thermistor 23 and the wet bulb thermistor 24.

Before proceeding to a detailed description of the control circuitry, reference is made to FIGURE 2 which is a table showing the operations to be performed upon the air heating-cooling mechanisms and the water heating-cooling mechanisms for the nine permutated, actual conditions of the air. These operations are designed to compensate for the interactions of the temperature and humidity effecting mechanisms. The first column lists the nine permutations given hereinabove. The next two columns identify the specific condition of the air in terms of temperature and humidity errors, that is, general deviations of temperature and humidity from the preselected levels. The remaining columns indicate, by means of an X, the mechanism to be effectuated in order to correct for the specific condition of the air, which specific conditions are given in lines (A) to (I). For example, when the temperature and the humidity are both at the preselected level, all of the effectuating mechanisms are dormant. However, when the air is at the preselected temperature but is "too humid" (line C), the water cooling mechanism is effectuated. On the other hand, when the temperature is "too low" and the air is "too dry," the water heating mechanism is effectuated at a high rate. The control channel information, appearing on lines (A) to (I) of the table will be carried over to the description of the circuit operation.

The schematic circuit diagram is shown in FIGURE 3, to which reference now is made. The two control channels, supplying information for the actuation of the proper heating and cooling elements, are defined by the two, four arm bridges 30 and 31, each bridge having its input diagonals connected to a source of power 32 providing a regulated, A.C. output voltage. It should be noted that the bridges 30 and 31 are connected in opposed polarity, or phase, to the power supply 32. The dry bulb temperature-sensing thermistor 23 forms one arm of the bridge 30 whereas the wet bulb temperature-sensing thermistor 24 forms one arm of the bridge 31. The adjacent arm of the bridge 30 comprises an adjustable resistor 33 having an index arm cooperating with a scale 34 calibrated in dry bulb temperature values. Similarly, the adjacent arm of the bridge 31 comprises an adjustable resistor 35 having an index arm cooperating with the wet bulb temperature-calibrated scale 36. It will be apparent that the adjustable resistors 33 and 35 provide the set-points for the two channels of the controller, that temperature deviations from the set-point are measured by the dry bulb thermistor 23 and that the wet bulb temperature deviations from the set-point are measured by the wet bulb thermistor 24. The humidity error from the set-point is measured by subtracting the wet bulb error from the dry bulb error. For instance, if the air (dry bulb) temperature should rise and the wet bulb temperature should remain constant, this would mean that the humidity has gone down. If the wet bulb temperature should rise and the dry bulb temperature should remain constant, this would mean that the humidity has risen. A subtraction of the wet bulb temperature error from the dry bulb temperature error provides necessary and sufficient humidity information to operate the control system.

The output diagonals of the bridges 30 and 31 are connected, respectively, to the amplifiers 37 and 38, which amplifiers each provide A.C. outputs algebracially proportional to the degree of unbalance of the associated bridges. Most common types of A.C. amplifiers are suitable for use with the remainder of the specific circuit to be described herein, provided that they have a negligibly small phase shift and no phase reversal. The amplifier 37 provides an output voltage of positive reference phase between the lead 101 and ground when the air temperature is "too high," a voltage of negative reference phase across the lead 101 and ground when the air (dry bulb) temperature is "too cold," and no voltage when the air temperature is at the set-point value. Similarly, the amplifier 38 provides a proportional output voltage, with a reversed phase polarity from that of amplfier 37 for a given sign of wet bulb temperature error. This relative reversal of phase of the two bridge output voltages is present because the bridges 31 and 30 are connected to the A.C. power supply 32 in opposite polarity sense. The output of amplifier 38 is combined with the output of amplifier 37 in a resistive subtractor circuit 41. A voltage of negative reference phase appears across the lead 102 and ground when the air is "too humid," a voltage of positive reference phase appears across lead 102 and ground when the air is "too dry," and no voltage appears when the humidity is at the set-point value.

Lead 101 is connected to the grids of vacuum tubes 103 and 104. The plate of vacuum tube 103, which is connected to an A.C. source of positive reference phase through relay coil 74, can conduct only when the positive reference phase is instantaneously positive. On the other hand, the plate of vacuum tube 104, which is connected to an A.C. source of negative reference phase through the relay coil 62, can conduct only when the negative reference phase becomes instantaneously positive. Therefore, vacuum tube 103 can conduct only when lead 101 has a voltage in phase with the positive reference phase, which occurs when the air temperature is "too high"; and vacuum tube 104 can conduct only when lead 101 has a voltage in phase with the negative reference phase, which occurs when the air temperature is "too low." Similarly, vacuum tube 105, whose grid is connected to lead 102, can conduct only when the air is "too humid" and vacuum tube 106 can conduct only when the air is "too dry." The flow of currents in the plate circuits of the vacuum tubes 103, 104, 105 and 106, which correspond to error conditions of "too high," "too low," "too humid," and "too dry," respectively, results in the energization of the operating coils of relays 44, 45, 46 and 47, respectively.

As shown in FIGURE 3, all of the relays 44–47 are deenergized and the relay contacts are connected together to form a relay tree. The relay 44 has one set of single-pole, double-throw contacts, designated "b" (back contact) and "f" (front contact) and "m" (movable contact). The relay 45 is provided with two, similar sets of contacts, with the movable contacts "m" mechanically coupled together for simultaneous operation. The relays 46 and 47 each have three sets of similar contacts, with the movable contacts of each relay movable simultaneously. The operation of the relay contacts controls the voltage supplied to a diode matrix 48 in such a way as to provide nine possible output circuits which correspond to the nine permutations listed in the table of FIGURE 2. It will be noted that each of the diodes 50–57 is connected circuitwise, in the matrix, to correspond to the check points, X, in the table. These diodes conduct current from the relay contacts to the various output circuits to effect operation of the proper mechanism to change the condition of the air, namely, the solenoid-operated valves 18 and 20, the air heater 12, and water heater control elements which are here represented by the coils 16a and 16b. These components correspond to the similarly-identified components shown in FIGURE 1, with the exception of the water heater 16 which is represented in FIGURE 3 by two relay operating coils (16a and 16b) to effect a heating of the water at a high rate or a low rate by controlling the voltage applied to the heater 16. The specific circuit for effecting one or the other of the heating rates will be described in detail hereinbelow with specific reference to FIGURE 4. It is here pointed out that the fan 13, see FIGURE 1, operates continuously to effect a circulation of the air in the direction generally indicated by the arrows. Such circulating air passes over the surface of the water. When necessary, in order to maintain the preselected set of conditions of the air, the air directed over the water surface is heated or cooled by means of the heater 12 or the cooling coil 19, respectively.

The diodes 50–57, shown in FIGURE 3, prevent reverse conduction of electric current which prevents the voltage applied to one output circuit from adversely effecting other output circuits. Electric power for operation of the control system is obtained from a conventional A.C. power line, closure of the switch 60 energizing the power supply 32 and closure of the switch 61 applying the voltage to the movable contact of the relay 44 through diode 107, which diode insures the correct instantaneous power supply polarity for proper operation of the diodes 50–57.

The operation of the control circuit will be understood from the following examples. Assume a start up set of conditions and that it is desired to provide a set of conditions of 80° F. temperature and 50% relative humidity within the chamber. The index arm of the bridge resistor 33 is aligned with the 80° mark on the associated scale 34 and the index arm of the bridge resistor 35 is aligned with the 67° F. mark on the associated scale 36. The value of 67° F. is determined by consulting a conventional psychrometric table. The corresponding sensing elements 23 and 24 are effected by the actual temperature within the chamber and the two bridges 30, 31 are unbalanced, it being assumed that the temperature and humidity within the chamber each are below the preselected levels. Under such conditions, the air within the chamber is "too cold" and "too dry," corresponding to the permutation (E) in the table of FIGURE 2. In consequence, the amplifier 37 produces an output voltage which causes vacuum tube 104 to pass current through the operating coil 62 of the relay 45. At the same time, the unbalance of the bridge 31 results in an output voltage from the amplifier 38, which voltage is combined in the subtracter circuit 41 with the output voltage of the amplifier 37. The net effect of such voltage combination is the provision of a voltage on the grid of the vacuum tube 106, thereby causing this tube to pass a current which energizes the operating coil 63 of the relay 47. With the relays 45 and 47 in the energized condition, power is applied to the heater control element 16b to heat the water at a high rate, the circuit being traced as follows; the line lead 64, closed contacts m and b of deenergized relay 44, lead 65, closed contacts m and f of the energized relay 45, lead 66, closed contacts m and b of the deenergized relay 46, lead 67, closed contacts m and f of the energized relay 47, lead 68, diode 53 and lead 69.

If, now, the air temperature reaches 80° F. but the humidity is still too low, the bridge 30 is balanced whereby the output voltage of the amplifier 37 is zero and the relay 45 becomes deenergized. However, the bridge 31 remains unbalanced whereby the output voltage of the subtracter circuit remains across the lead 102 and ground, and the relay 47 remains energized. These conditions correspond to the permutation (B) in the table of FIGURE 2, specifically, the temperature of the air is "OK" but it is "too dry." Under such conditions, the water heater control element 16a is energized to continue heating the water but at a low rate, the circuit being traced as follows, line lead 64, closed contacts m and b of the deenergized relay 44, lead 65, closed contacts m and b of deenergized relay 45, lead 70, closed contacts m and b of the deenergized relay 46, lead 71, closed contacts m and f of the energized relay 46, lead 72, diode 50, and lead 73.

Assuming, now, that the humidity of the air reaches the preselected level of 50% but that, in the meantime, the temperature fell below the preselected level of 80°. This condition corresponds to the permutation (D) of the table, namely, the air is "too cold" and the humidity is "OK." Under these conditions, the bridges 30 and 31 are unbalanced in nearly equal amounts in the same (too cold) direction, but the electrical outputs of the bridges are of opposite phase because of their relation to the power supply 32. Consequently, the amplifier 37 provides an output voltage across the lead 101 and ground, the net effect being the energization of the operating coil 62 of the relay 45 while the output voltage of the subtracter circuit is zero because the outputs of the amplifiers 37 and 38 are equal and of opposite phase. This continues the heating of the water at a low rate and also applies power to the air heater 12 (see also FIGURE 1), the circuit being traced as follows; the line lead 64, closed contacts *m* and *b* of the deenergized relay 44, lead 65, closed contacts *m* and *f* of the energized relay 45, lead 66, closed contacts *m* and *b* of the deenergized relay 46, lead 67, closed contacts *m* and *b* of the deenergized relay 47, lead 115, diodes 52 and 52' and the leads 116 and 73.

It will now be apparent that the balance points of the two bridges 30, 31 are set manually in accordance with the preselected temperature and humidity. An unbalance of one or both bridges, in one or the other directions, results in the operation of one or more of the relays 44 through 47 thereby to actuate an appropriate control mechanism in such manner as to maintain the condition of the air at the preselected levels of temperature and humidity. While FIGURE 3 and the related description is limited to nine permutations of specific conditions effecting the state of the air within the chamber, it is apparent additional permutation can be provided for. For example, five decrete outputs can be provided by suitable bridge-amplifier combinations in conjunction with four detectors as exemplified by vacuum tubes 103 and 104, each output voltage corresponding to a specific condition such as, for example, (1), "much greater than the preset operating point," (2) "slightly greater than the preset operating point," (3,) "at the preset operating point," (4), "slightly below the preset operating point," and (5), "far below the operating point." With respect to a control system for use with a plant growth environmental chamber, a third or fourth channel could be added to take into consideration the effect of light intensity and absolute air temperature in addition to air temperature errors, etc.

Reference, now, is made to FIGURE 4, which is a schematic circuit diagram of the arrangement for heating the water bath at two different rates. A single resistance heater element 16 is utilized. The relay operating coils 16*a* and 16*b* (see also FIGURE 3), are energized when the control system calls for heating the water bath at a low or a high rate, respectively. The associated relays 80, 81 are shown in the deenergized condition in FIGURE 4. A pivotally-mounted contact arm 82, biased in a counterclockwise direction by a spring 83, engages a back contact 84 or a front contact 85 in correspondence with rotation of a cam 86 mechanically coupled to a motor 87. A differential thermostat 88 is connected between a source of voltage, indicated by the battery 89, and the operating coil 90 of a relay 91. The thermostat is disposed within the environmental chamber and is adjusted so that the relay 91 is deenergized, as shown, when the water bath temperature is not too much higher than the temperature of the contained air.

Assuming that no heating of the water is called for by the control system, the relays 80 and 81 are deenergized as shown in FIGURE 4. The 1-r.p.m. motor 87 will run, the circuit being traced as follows; the line lead 64', the normally-closed contacts *m* and *b* of the deenergized relay 81, lead 92, contact 84, arm 82, lead 93, the motor 87 and the leads 94, 95 and 96. The motor continues to run until the cam 86 permits a transfer of the movable arm 82 out of engagement with the contact 84 and into engagement with the contact 85, thereby opening the motor circuit. At some later time, assume that the control system calls for heating water at a low rate. This results in the energization of the operating coil 16*a*, of the relay 80, thereby closing the relay contacts *m* and *f*, whereby current immediately flows through the heating element 16, the circuit being traced as follows: line lead 64', closed contacts *m* and *f* of the energized relay 80, leads 97 and 93, contact arm 82, the now-closed contact 85, leads 98 and 99, heater 16 and the lead 96. Also immediately, the motor 87 runs, since one side of the motor is connected to the contact arm 82 and the other side connected to the other input power terminal by the leads 94, 95 and 96. The motor runs continuously as long as the relay 80 is energized, thereby opening and closing the cam switch contacts 82 and 85 and, therefore, making and breaking the power connection to the heater 16. Consequently, the heater operates at a low average power level.

If water heating at a high rate is called for, relay 80 is deenergized and relay 81 is energized. Under this condition, the heater 16 is continuously energized, the circuit being traced as follows; line lead 64', closed contacts *m* and *f* of the now-energized relay 81, lead 99, heater 16 and lead 96. If the cam switch contacts 82 and 85 should be closed at this time, the motor will merely run until the contact arm 82 is disengaged from the contact 85 and engaged with the contact 84.

If, at a later time, a low rate of water heating is called for, the relay 81 is deenergized (thereby immediately cutting off power to the heater) and the relay 80 is energized (thereby starting the motor). The heater will not be energized again until the cam 86 rotates far enough to permit closure of the cam switch contacts 82 and 85. The motor will continue to run, cycling power to the heater 16 in on-off manner until the relay 80 is deenergized.

It is apparent, therefore, that when the control system operates from an "off" condition to a condition calling for a low rate of water heating, full power immediately is applied to the water bath heater for a short time to start the warming up process. When the system operates from a condition of "high heat" to "low heat," the power to the heater immediately is cut off for a time to lower the heating rate more quickly. This gives a time derivative effect on changes of the heating rate, causing a desirable anticipation of the heating requirement.

In the control system described herein, temperature control information is supplied to the control system by a dry bulb thermistor. Humidity control information is obtained by electrically subtracting a wet bulb thermistor temperature from the dry bulb temperature. This information is quantitized into nine possible permutations, for each one of which a preselected set of control variables is applied to the air mass confined within the chamber. In this way, the controls anticipate the various thermodynamic interactions that are related to simultaneous control of temperature and humidity. Since the set-point level of temperature and humidity involves the setting of two, calibrated and adjustable resistors, which form arms of two independent bridges, a cam-type recorder-programmer can be used to cause the temperature-humidity variations to follow the outline of a pre-cut cam.

The described relay tree and diode matrix provides a simple, positive means for effecting the operation of one or more control mechanisms for maintaining a variable condition in a preselected state. Further, the matrix may very easily be modified after its construction if it is desired to further change the character of the information obtained from the sensing elements thereby to provide a more accurate and stable operation. The control circuit, although described for use in a temperature-humidity controller, is adapted for use to effect the simultaneous control of two or more variable in other systems.

Having given a detailed description of the invention, those skilled in this art will be able to make various changes and modifications to adapt same for use in specific applications and under varying conditions. It is contemplated that such changes and modifications can be made without departing from the scope and spirit of the invention as recited in the following claims.

I claim:
1. Apparatus for maintaining the temperature and humidity of a body of air at a preselected level, which apparatus comprises,
   (a) a dry bulb temperature-sensing element connected in one arm of a first bridge circuit,
   (b) means for adjusting a second arm of the first bridge circuit to a predetermined value,
   (c) a wet bulb temperature-sensing element connected in one arm of a second bridge circuit,
   (d) means for adjusting a second arm of the second bridge circuit to a predetermined value,
   (e) means applying a fixed voltage across the input diagonals of the said bridge circuits,
   (f) first amplifier means connected to the output diagonals of the first bridge circuit and producing a first output voltage which depends upon the direction of bridge circuit unbalance,
   (g) second amplifier means connected to the output diagonals of the second bridge circuit and producing a second output voltage which depends upon the direction of bridge unbalance,
   (h) means comparing the said output voltages and providing a third output voltage when the compared output voltages are unequal,
   (i) separate control elements for heating and cooling the air and for adding and removing moisture from the air, and
   (j) control means selectively energized by the output voltages of the first amplifier means and the said third output voltage, said control means effecting actuation of selected control elements so as to alter the temperature and humidity of the air in a direction to maintain the two bridge circuits in balanced condition.

2. The invention as recited in claim 1, wherein the said control elements are electrically actuated and wherein the said control means comprises a plurality of relays having operating coils individually energized by the stated output voltages and interconnected contacts for applying an energizing voltage to selected control elements.

3. Apparatus for maintaining a body of air in a chamber at a predetermined temperature and humidity comprising,
   (a) a temperature-sensing element connected in one arm of a first, four arm resistance bridge,
   (b) means for adjusting a second arm of the first bridge to a predetermined value,
   (c) a humidity-sensing element connected in one arm of a second, four arm resistance bridge,
   (d) means for adjusting a second arm of the second bridge to a predetermined value,
   (e) means applying a fixed voltage across the input diagonals of the said bridges,
   (f) first amplifier means connected to the output diagonals of the first bridge and producing a first output voltage having a sign depending upon the direction of bridge unbalance,
   (g) second amplifier means connected to the output diagonals of the second bridge and producing a second output voltage having a sign depending upon the direction of bridge unbalance,
   (h) a water bath in the chamber,
   (i) a first heating element and a first cooling element immersed in the water bath,
   (j) a second heating element and a second cooling element disposed proximate to the water bath,
   (k) circulating means drawing the air past the second heating and cooling elements and directing it against the surface of the water bath, and
   (l) control means energized by the said first and second output voltages, said control means effecting actuation of one or more of the said heating and cooling elements so as to alter the tempertaure and humidity of the air in a direction to maintain the two bridges in balanced conditions.

4. The invention as recited in claim 3, including means comparing the said first and second output voltages and providing a third output voltage when the compared voltages are unequal, and wherein the said control means is energized by the said first and third output voltages.

5. Apparatus for maintaining a body of air in a chamber at a predetermined temperature and humidity comprising,
   (a) a dry bulb temperature-sensing element connected in one arm of a first, four arm resistance bridge,
   (b) means for adjusting a second arm of the first bridge to a predetermined value,
   (c) a wet bulb temperature-sensing element connected in one arm of a second, four arm resistance bridge,
   (d) means for adjusting a second arm of the second bridge to a predetermined value,
   (e) means applying a fixed voltage across the input diagonals of the said bridges,
   (f) first amplifier means connected to the output diagonals of the first bridge and producing a first output voltage depending upon the direction of bridge unbalance,
   (g) second amplifier means connected to the output diagonals of the second bridge and producing a second output voltage depending upon the direction of bridge unbalance,
   (h) a water bath in the chamber,
   (i) a first heating element and a first cooling element immersed in the water bath,
   (j) a second heating element and a second cooling element disposed proximate to the water bath,
   (k) circulating means drawing the air past the second heating and cooling elements and directing it against the surface of the water bath, and
   (l) control means energized by the said first and second output voltages, said control means effecting actuation of one or more of the said heating and cooling elements so as to alter the temperature and humidity of the air in a direction to maintain the two bridges in balanced conditions.

6. The invention as recited in claim 5, wherein the said control means comprises a plurality of relays having operating coils individually energized by the said output voltages and sets of interconnected contacts arranged to close an electrical circuit between a source of energizing voltage and a selected one or more of said heating and cooling elements in correspondence with the energization of one or more of said relay operating coils.

7. The invention as recited in claim 6, including means for effecting a heating of the water bath by the said first heating element at two different rates in accordance with the energization of predetermined relay operating coils.

8. The invention as recited in claim 5, including means comparing the said first and second output voltages and providing a third output voltage when the compared voltages are unequal and wherein the control means comprises a plurality of relays having operating coils energized by the said first and third output voltages and sets of interconnected contacts arranged to close an electrical circuit between a source of energizing voltage and a selected one or more of said heating and cooling elements in correspondence with one or more of said relay operating coils.

9. The invention as recited in claim 8, including means for effecting a heating of the water bath by the said first heating element at two different rates in accordance with the energization of predetermined relay operating coils.

10. A control system for maintaining a set of conditions in a predetermined state, which state is determined by the values of a plurality of variable factors some of which interact with each other during the control process, said apparatus comprising, (a) adjustable means for establishing individual reference values for the variable factors, which reference values prevail when the condition is in the predetermined state, (b) means responsive to the instantaneous values of the variable factors and providing separate primary signals when the values of the variable factors differ from their respective reference values, (c) means responsive to said primary signals and providing a plurality of separate output signals which are the resultant signals of the said primary signals, and (d) means including a plurality of control elements actuated by the said output signals, each element being adapted, when actuated, to effect the value of at least one of the variable factors.

11. A control system for maintaining a set of conditions in a predetermined state, which state depends upon the values of a plurality of variable factors, certain of said variable factors interacting with each other during the control process, said apparatus comprising, (a) adjustable means for establishing individual reference values for each of the variable factors to be controlled, which reference values prevail when the condition is in the predetermined state, (b) means repsonsive to the instantaneous values for each of the variable factors to be controlled and providing a plurality of separate output signals when the values of the variable factors differ from their respective reference values, each output signal corresponding to only one of the variable factors, (c) means algebraically adding some of said output signals to produce resultant signals which correspond in inverse sense to the interaction effects of said certain variable factors, (d) means including a plurality of control elements each adapted, when activated, to effect a change in some of the variable factors, the number of control elements being such that by interaction of said elements in operation, said system is capable of effecting any one of said variables singly at any one time, and (e) a plurality of control members, each control member controlling the actuation of one of said control elements and each control member being energized in response to only one of the said output or resultant signals.

12. The invention as recited in claim 11, including a selecting mechanism operatively interposed between the said control elements and control members, said mechanism being controlled by the energized control members and providing a plurality of separate control signals for actuation of the said control elements, said control signals being permutations of the said output and resultant signals.

13. The invention as recited in claim 12, wherein the selecting mechanism comprises a voltage source; a plurality of power relays and a plurality of diodes; each relay having an operating coil energized by the voltage source upon energizing of an associated one of the said control members, and said relays having contacts interconnected between the voltage source and the diodes to provide the said control signals.

14. A control system for controlling the values of a plurality of variable factors which effect the state of a set of conditions to be controlled, said system comprising, (a) a plurality of electrical bridges having a fixed voltage applied to the input diagonals thereof, (b) adjustable means settable to unbalance each bridge to an extent corresponding to a preselected reference value for each of the variable factors, (c) a plurality of sensing means individually connected to one of said bridges, each sensing means being responsive to changes in the value of an associated variable factor and producing a balanced condition of the associated bridge when the value of the associated variable factor equals the reference value, (d) means responsive to the voltages appearing across the output diagonals of each bridge and producing discrete output voltages having a polarity depending upon the directional unbalance of each bridge, (e) means algebraically adding some of the said output voltages to produce resultant voltages, (f) a plurality of control elements each adapted when actuated to effect the levels of at least one of said variable factors, and (g) a plurality of control members for effecting individual actuation of the said control elements, each control member being responsive only to a single output voltage or resultant voltage of predetermined polarity.

15. Control apparatus for maintaining a variable set of conditions in a predetermined state and comprising, (a) a plurality of electrical bridges each having a fixed voltage applied across the input diagonals thereof, (b) adjustable resistors in one arm of each bridge, each resistor being settable to unbalance the associated bridge to a predetermined extent, (c) variable resistance sensing elements individually responsive to the actual state of the set of conditions and connected in another arm of each bridge, said elements balancing the associated bridge when the set of conditions is in the predetermined state, (d) first amplifier means connected to the output diagonals of one bridge and producing a first output voltage which varies in sign in correspondence with the direction of bridge unbalance, (e) second amplifier means connected to the output diagonals of the other bridge and producing a second output voltage which varies in sign in correspondence with the direction of bridge unbalance, (f) means algebraically adding some of the output voltages to produce resultant voltages, (g) a plurality of control elements adapted, when actuated, to effect the actual state of the set of conditions, (h) a source of energizing voltage for actuation of the said control elements, and (i) a plurality of control means each controlling the actuation of one of said control elements by the energizing voltage, each of said control means being independently energized by only one of the output voltages and resultant voltages having a predetermined sign.

16. The invention as recited in claim 15, wherein the said control means comprises a plurality of power relays, each having an operating coil individually energized by one of said output or resultant voltages, circuit elements connecting the contacts of the power relays to the source of energizing voltage and to said control elements in such manner as to energize one or more of the control elements in correspondence with the energization of one or more of the power relay operating coils.

17. The invention as recited in claim 16 wherein one of said control elements is an electrical heater, and including, (1) a first control relay having an operating coil and a movable contact spaced from a front contact when the coil is deenergized, (m) a second control relay having an operating coil and a movable contact engaged with a back contact when the coil is deenergized and engaged with a front contact when the coil is energized, (n) a cam switch comprising a contact arm alternatively engaging first and second fixed contacts upon rotation of a cam mechanically-coupled to an electric motor, (o) leads connecting one side of said source of voltage to the movable contacts of the said first and second control relays, (p) a lead connecting the other side of said voltage source to one end of said heater and one side of the electric motor, (q) a lead connecting the front contact of the first control relay to the other side of the electric motor and to said contact arm, (r) leads connecting the first fixed contact of the cam switch to the front contact of said first control relay and to the other end of said heater, (s) a lead connecting the second fixed contact of the cam switch to the back contact of the second control relay, (t) circuit elements energizing the operating coil of said first control relay upon energization of a predetermined one of said power relays, and (u) circuit elements energizing the operating coil of said second control relay upon energization of a predetermined two of said power relays.

18. The invention as recited in claim 16, wherein the power relay contacts are connected to form a relay tree and said control elements are connected to the source of energizing voltage through a diode matrix.

References Cited by the Examiner
UNITED STATES PATENTS

| | | | |
|---|---|---|---|
| 1,984,135 | 12/1934 | Houston | 165—21 |
| 2,053,771 | 9/1936 | Erschen et al. | 236—44 |
| 2,100,110 | 11/1937 | Smith et al. | 236—44 |
| 2,103,904 | 12/1937 | Hill | 236—44 |
| 2,628,076 | 2/1953 | Smith | 165—21 |
| 2,685,433 | 8/1954 | Wintermann | 165—21 |
| 2,828,464 | 3/1958 | Nixon et al. | 236—44 X |
| 2,919,337 | 12/1959 | Brosseau et al. | 219—20 |
| 2,966,342 | 12/1960 | Newton | 165—21 |
| 2,974,870 | 3/1961 | Pitts | 236—44 |
| 3,040,156 | 6/1962 | McGlaughlin. | |
| 3,046,411 | 7/1962 | Steiner. | |
| 3,053,515 | 9/1962 | Woodling | 165—21 |
| 3,062,942 | 11/1962 | Findlay et al. | 219—20 |

JAMES W. WESTHAVER, *Primary Examiner.*